United States Patent
Whelan

(10) Patent No.: US 8,176,063 B2
(45) Date of Patent: May 8, 2012

(54) SYSTEM AND METHOD FOR NON-OVERWRITING EXTENSIBLE MAPPING

(75) Inventor: John Staehle Whelan, White Bear Lake, MN (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 330 days.

(21) Appl. No.: 12/549,800

(22) Filed: Aug. 28, 2009

(65) Prior Publication Data

US 2010/0235370 A1   Sep. 16, 2010

Related U.S. Application Data

(60) Provisional application No. 61/159,590, filed on Mar. 12, 2009.

(51) Int. Cl.
*G06F 17/30* (2006.01)
*G06F 7/00* (2006.01)

(52) U.S. Cl. ...................................................... 707/756

(58) Field of Classification Search .................. 707/763, 707/999.102, 999.001; 715/790, 804; 716/2
See application file for complete search history.

(56) References Cited

U.S. PATENT DOCUMENTS

| | | | |
|---|---|---|---|
| 5,241,624 A * | 8/1993 | Torres | 715/790 |
| 5,808,611 A * | 9/1998 | Johnson et al. | 715/804 |
| 6,871,204 B2 * | 3/2005 | Krishnaprasad et al. | 707/999.102 |
| 7,096,224 B2 * | 8/2006 | Murthy et al. | 707/763 |
| 7,127,445 B2 * | 10/2006 | Mogi et al. | 707/999.001 |
| 2009/0055780 A1 * | 2/2009 | Acar et al. | 716/2 |
| 2009/0106282 A1 | 4/2009 | Silverman | |

FOREIGN PATENT DOCUMENTS

| | | |
|---|---|---|
| EP | 1519266 A2 | 3/2005 |
| WO | WO 0122257 A2 | 3/2001 |

OTHER PUBLICATIONS

Wustner, et al. Published in Advanced Issues of E-Commerce and Web-Based Information Systems, Proceedings Fourth IEEE International Workshop. Jun. 26, 2002 (pp. 54-61); Magazine.

Naser, et al. Published in Information Reuse and Integration. IEEE International Conference, Jul. 13, 2008 (pp. 1-6); Magazine.

Bossung, et al. Published in Automated Software Engineering Proceedings, 19th International Conference on Linz, Sep. 20, 2004 (pp. 208-217); Magazine.

Phillip Engel, et al., "Extensible Business Reporting Language (XBRL) 2.1", Jul. 2, 2008, p. 1-165.

* cited by examiner

*Primary Examiner* — Sathyanarayan Pannala

(57) ABSTRACT

A method for data mapping, and corresponding computer readable medium and data processing system. The method includes loading an input object in a data processing system, the input object including a plurality of elements. The method includes loading a mapping control file and processing the input object and the mapping control file to produce a result set including a plurality of result documents. The method includes combining multiple ones of the plurality of result documents according to inheritance data defined in the mapping control file to produce a combined result. The method includes storing the combined result in the data processing system.

20 Claims, 7 Drawing Sheets

SYSTEM AND METHOD FOR NON-OVERWRITING EXTENSIBLE MAPPING

CROSS-REFERENCE TO OTHER APPLICATION

This application claims priority from U.S. Provisional Patent Application 61/159,590, filed Mar. 12, 2009, which is hereby incorporated by reference.

TECHNICAL FIELD

The present disclosure is directed, in general, to systems and methods for data conversion.

BACKGROUND OF THE DISCLOSURE

It is often necessary or advantageous to convert data between disparate systems or applications.

SUMMARY OF THE DISCLOSURE

Various embodiments include a method for data mapping, a data processing system comprising a processor and accessible memory that is configured to perform the steps of a similar method, and a tangible computer-readable medium encoded with computer executable instructions that, when executed, cause a data processing system to perform the steps of a similar method. The method includes loading an input object in a data processing system, the input object including a plurality of elements. The method includes loading a mapping control file and processing the input object and the mapping control file to produce a result set including a plurality of result documents. The method includes combining multiple ones of the plurality of result documents according to inheritance data defined in the mapping control file to produce a combined result. The method includes storing the combined result in the data processing system Some embodiments include further method steps, such as receiving a change to at least one result document of the result set, propagating the change to other result documents of the result set according to the inheritance data, recombining multiple ones of the plurality of result sets, by the data processing system, according to the inheritance data to produce a revised combined result, and storing the revised combined result in the data processing system.

In some embodiments, the input object is an XML document. In some embodiments, the result set includes a result document each mapping defined in the mapping control file with a criterion matching that of an element of the input object. In some embodiments, the combined result is a transformation of the input object into a second data format. In some embodiments, the mapping control file defines parent-child inheritance relationships between multiple ones of the plurality of result documents. Some embodiments include a further process of generating an element identification attribute for at least one of the plurality of attributes.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Various embodiments disclosed herein allow for custom XSL mappings modify the results of existing mappings without modification to existing mappings. This allows for data mappings to be extended and reused while still maintaining knowledge of the source of each individual change. The techniques described herein enable re-use of existing mappings in multiple sub-cases without requiring copies to be created; thus ensuring that all mappings that use a common base mapping stay up-to-date and synchronized.

Many users construct data mappings between different systems and applications. In some cases, software providers provide mappings for out-of-the-box (OOTB) classes referenced in their products, but these mappings do not incorporate user-specific extensions that may have been added to the user's systems. In some systems, the user is required to clone the OOTB mappings and modify them to suit the user-specific mapping needs. When OOTB mapping updates are available (new feature, bug fix, etc.), the modifications must be manually adapted to the customer-specific mappings.

For example, when a general mapping of a product contains multiple subclasses, each subclass mapping must contain the complete set of mappings. If a change occurs in how a base class is to be mapped to a destination, in some systems, each subclass mapping needs to be manually updated with the change. Additionally, this approach does not scale well to have different developers work on mappings due to possible communication gaps and concurrent access to files.

The disclosed embodiments include improved processes for updating such mappings. The disclosed embodiments can improve any general-purpose schema-mapping software by simplifying and automating solutions to complex mapping problems.

Figure 1:
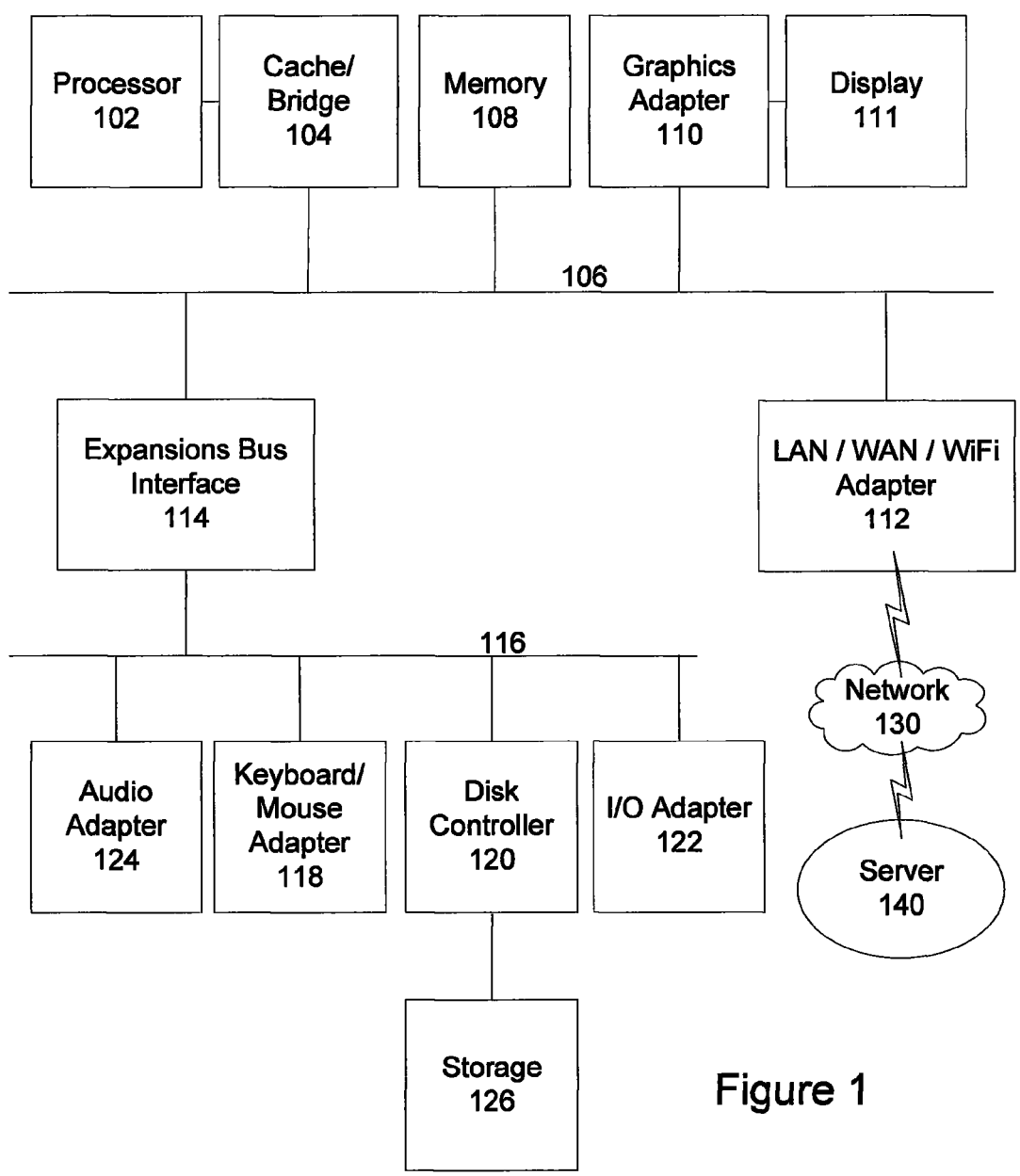
FIG. 1 depicts a data processing system in accordance with disclosed embodiments.

FIG. 1 depicts a block diagram of a data processing system in which an embodiment can be implemented when configured to perform the mapping, combining, and other functions described. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments include a Mapper Engine that supports factor inheritance. The Mapper Engine can model parent-child relationships between Factors and can merge output of different factors based on these parent-child relationships. In various embodiments, the can support XML Schema aware transformations, allowing Factors to also operate on subtypes of the types it is processing. In some embodiments, factors and factoring processes as used herein can correspond to those processes and factors as described in U.S. patent application Ser. No. 11/975,527, filed Oct. 19, 2007, which is hereby incorporated by reference in its entirety.

Because the map will ultimately be a large complex transform, it is desirable to "break it up" into different parts (factors) by the Mapper Engine. Each factor is used in part of the mapping process.

In various embodiments, described in more detail below, the Mapping Engine can support an arbitrary number of levels of inheritance of factors, and can support multiple elements of the same element type within a factor.

In one mapping process, the Mapping Engine first loads the input data, in the first data format, to be mapped to a second data format. The input data has a plurality of input data objects. The system then loads Factor definitions, which can be part of a mapping control file. The Mapping Engine then breaks the problem down by determining which output data objects should be created from the input data. In each pass, the system identifies at least one output object to be created from a subset of the total input data objects.

Next, the system applies a Factor scope to determine which input data to process. For each type of input object(s) that has no references to other objects, mapping the system applies a Factor scope that will gather all the incoming data needed to create the output data. The Factor definitions, in the mapping control file, among other things defines a subset of data that must be mapped. The mapping system uses the factor definitions to first scope a subset of data and then to map it, as below. As part of the factor definitions in the mapping control file, relevant portions of the data can be given unique tokens to allow the any cross references to be resolved.

Next, for each Factor, the mapping system applies a Factor mapping to turn that sub-set of incoming data into the output objects, optionally using a schema that defines the output objects. In cases where a given object is directly translated to an object in the outgoing stream, the mapping system maps the correspondence between the incoming object and its output object. For output data objects that references only those objects that have already been output from above, the mapping system applies a set of Factors that will gather all the incoming data needed to create the output data. The mapping system repeats the factoring and mapping steps until all data is mapped.

Next, the mapping system resolves all cross references between each output data object. This process allows complex mappings to be broken down into simpler pieces, just as large numbers can be factored, and then reassembled in the final output process. Finally, having defined all mapping factors and resolved all cross references between the output data objects, the mapping system creates the output data, including the output data objects, according to the second data format and any required schema.

Various embodiments allow multiple TcFactors to be created for each input root object via multiple factors corresponding to the match criteria of the element. For a given input root object, each matching factor will result in the generation of a TcFactor. The result set of TcFactors that are generated from a given root element are related via a directed graph of inheritance where the starting point of the graph is specifically identified. As a post-processing step in the Mapping Engine, the result set of TcFactors can be consolidated down to a single TcFactor.

Figure 2:
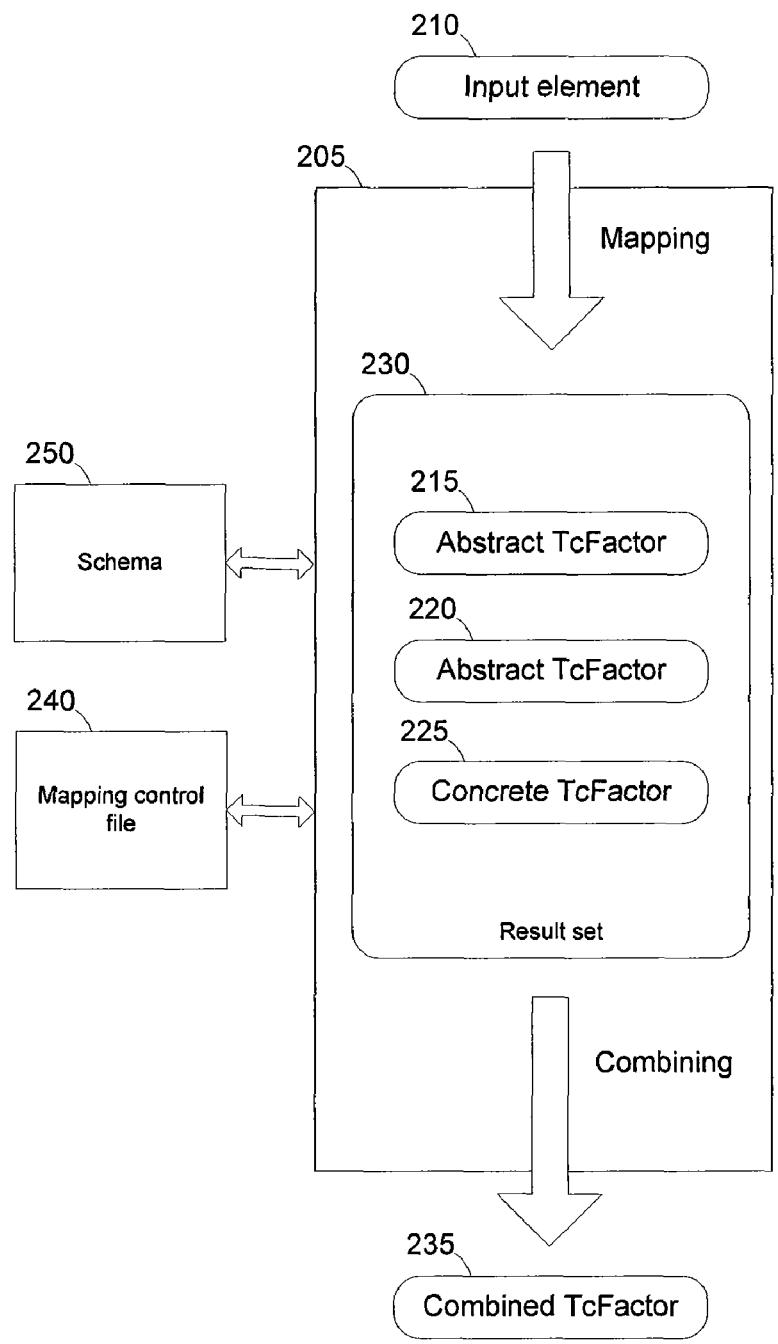
FIG. 2 illustrates the mapping of elements into factors in accordance with disclosed embodiments.

FIG. 2 illustrates the mapping of elements into factors in accordance with a disclosed embodiment.

The Mapper Engine 205 allows for multiple factors 215/220/225 to match a given input element 210, and also allows for a combined TcFactor 235 to be generated for each factor matching a given root-level element. Mapper Engine 205 uses mapping control file 240 to map the input element 210 to a result set 230 that can contain one or more result documents, such as one or more abstract TcFactors 215/220 and one or more concrete TcFactors 225, in accordance with schema 250, which defines the output structure. Mapper Engine 205 can combine the result set 230 into a combined TcFactor 235.

The Mapper Engine 205 uses a mapping control file 240 that allows the engine to specify inheritance in factors, before combining the results. The map control file, in some embodiments, contains several transforms such as XSL templates that meet the criteria (match) a given input. Instead of picking the best match, as does conventional XSL, all of the matching transforms are invoked, thus causing each transform to generate a resultant document (the output data object). This is followed by a combination step which uses inheritance, as defined in the mapping control file, to merge together the results into a single result.

The merging/combining process basically puts it all together, and in the case where two results are different for a given attribute, decides which result values should be used.

The mapping control file 240 includes attributes used to support inheritance in the TcFactors. The mapping control file 240 contains the input criteria for each resultant TcFactor, the transformations, such as XML transformations, for producing each resulting TcFactor, and the inheritance graph for each transform resultant TcFactor, which defines how to merge results.

The TcFactor.nodeType attribute specifies the role of this factor in a set of inheritances. Supported values are:

[unset]: The TcFactor does not participate any factor inheritance. This setting allows for backwards compatibility.
"concrete": A 'concrete' TcFactor has a one-to-one mapping.
"abstract": The TcFactor is used by another TcFactor which inherits, and may override the values contained in this TcFactor. TcFactor elements that are specified as 'abstract' are not starting points for creating result TcFactor elements.

TcFactor.parentName: If specified, this attribute specifies the type of the parent TcFactor for the current element. The value of the parentName attribute in the current TcFactor is substituted for the current TcFactor element factorId attribute's name in order to identify the parent TcFactor element.

Note that in some embodiments, the factorId attribute values are in the form of [factor type]_[factor ID]. A TcFactor with a parentName of 'TopFactor7' and a factorId of 'BottomFactor7_ItemIdValue2' would have a parent with a factorId of 'TopFactor7_ItemIdValue2'.

Figure 3:
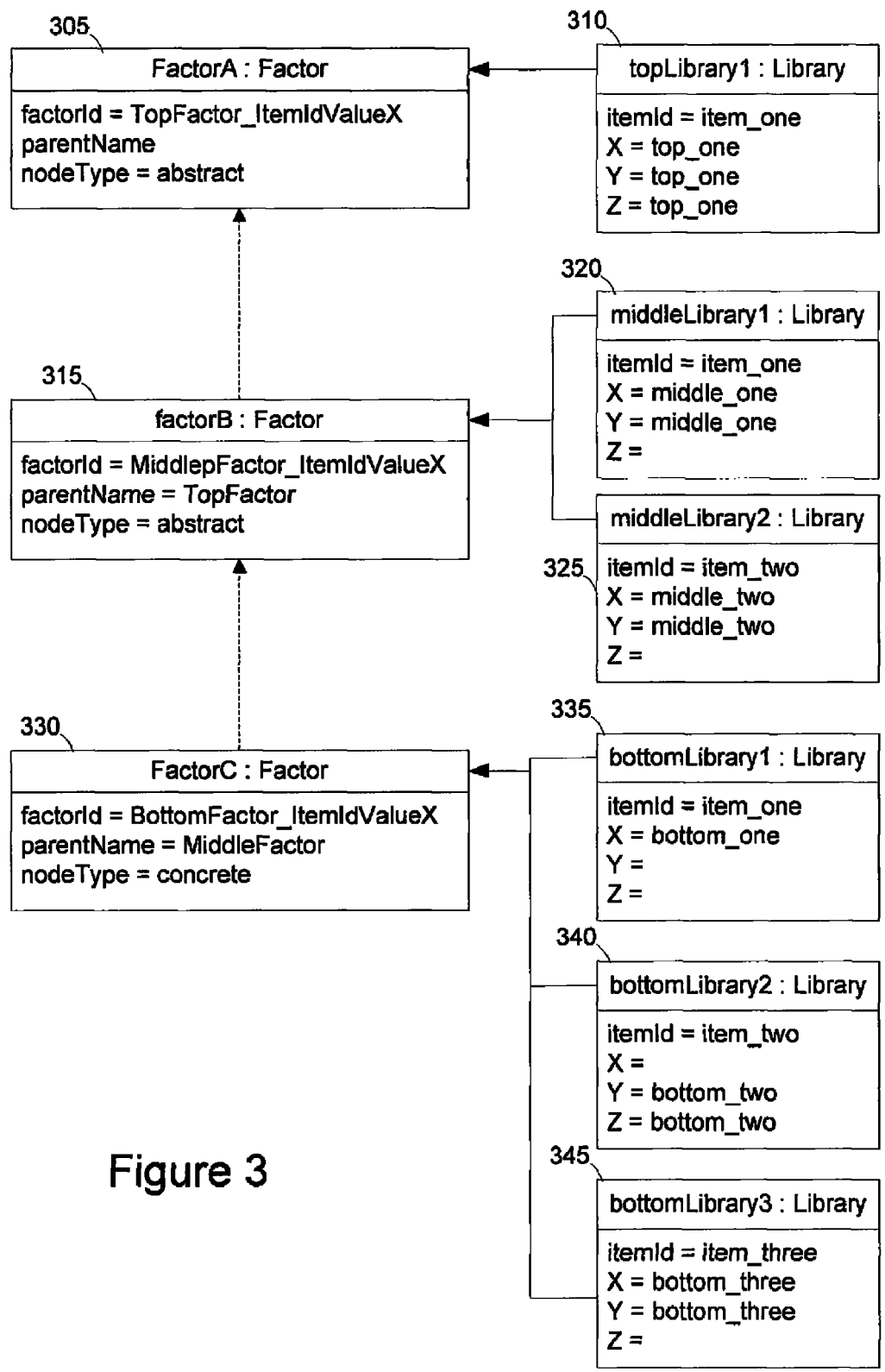
FIG. 3 shows an exemplary factor result set in accordance with disclosed embodiments.
Figure 4:
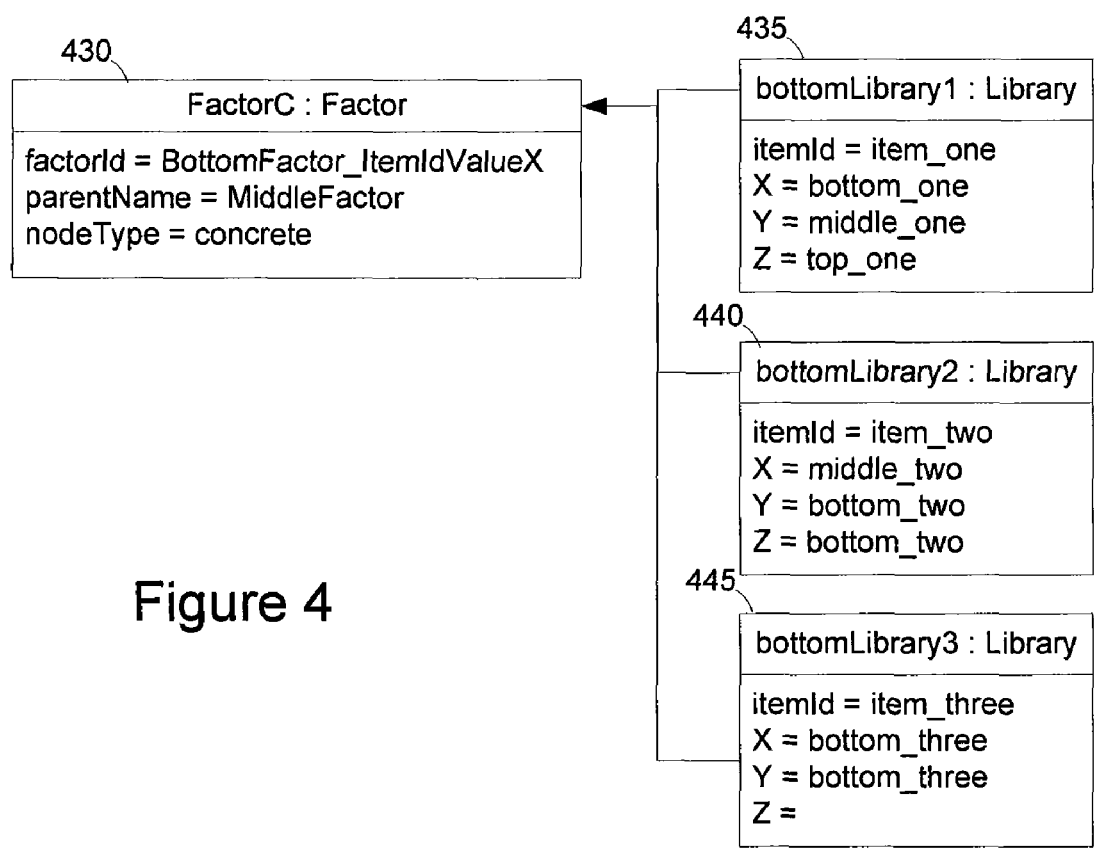
FIG. 4 shows a combined factor corresponding to the factor result set of FIG. 3, in accordance with disclosed embodiments.

The inheritance process of the Mapper Engine is additive in the setting of values. FIG. 3 shows an exemplary factor result set. FIG. 4 shows a combined factor corresponding to the factor result set of FIG. 3. The factor result set includes factor 205 associated with library element 310; factor 315, which inherits from factor 305, associated with library elements 320/325; and factor 330, which inherits from parent factor 315, associated with library elements 335/340/345. Not that each factor includes a parentName designating its parent factor, if any, that indicates how the combining is performed.

FIG. 4 shows a combined factor 430 that corresponds to factor 330 in FIG. 3. As can be seen, element 435 includes its own value for "X" (from element 335), its parent value for "Y" (from element 320), and its grandparent value for "Z" (from element 310). Element 440 includes its own value for "Y" and "Z" (from element 340), and its parent value for "X" (from element 325). Element 445 includes its own values corresponding to element 345, since there was no other "Library3" element in the result set of FIG. 3.

In each case, in a combined factor, an element of a child factor retains any existing value in the combined factor, and any empty values are replaced by the corresponding value of the parent factor, recursively.

In addition to inheritance, the Mapper Engine also consolidates foreign references to XML elements. Each element (even abstract ones) contain a key attribute such as <XSL:key>, and other elements may contain attributes that reference these key attributes. In order to retain referential integrity, the Mapper Engine implements simple substitution on key values; all foreign key values are resolved from abstract element key values to the key value of the combined element.

Note that, in some embodiments, the key value of combined element is the same value as specified in the concrete element. Note also that because inheritance is additive in some embodiments, all abstract TcFactor subelements will have a corresponding sub-element in the corresponding concrete TcFactor.

In order to support inheritance in factor sub-elements, the following information is needed regarding sub-elements:

Element Identification Attribute: For each type of element, there must be an attribute the uniquely identifies the source object that was used to create. Additionally, each element must contain this attribute. The existence of this attribute allows the Mapper Engine to manage TcFactors containing multiple sub-elements of the same type. The combiner process uses the attribute 'keyAttributes' to keep track of the Element Identification Attribute.

Foreign Reference Attributes: The combiner code need to know each attribute which acts as a foreign reference to an element. It uses this information in order to redirect foreign references from abstract elements to result elements. In some embodiments, the combiner uses the attribute 'refKeyAttributes' to keep track of attributes that represent foreign references. The code works both for single reference and multiple reference values.

In various embodiments, the element identification attributes and foreign reference attributes can be obtained in different ways. In some embodiments, these attributes can be stored in and read from the mapping control file. In some other embodiments, the Mapping Engine can retrieve the information from schema. In some other embodiments, the Mapping Engine supports configuration settings to allow a user or other application to specify the attributes.

In some embodiments, the Mapping Engine can auto-generate element identification attributes, for example by generating a hash of the input object, and setting that value to a defined attribute before the Mapping Engine splits apart the input XML document into factors.

Figure 5:
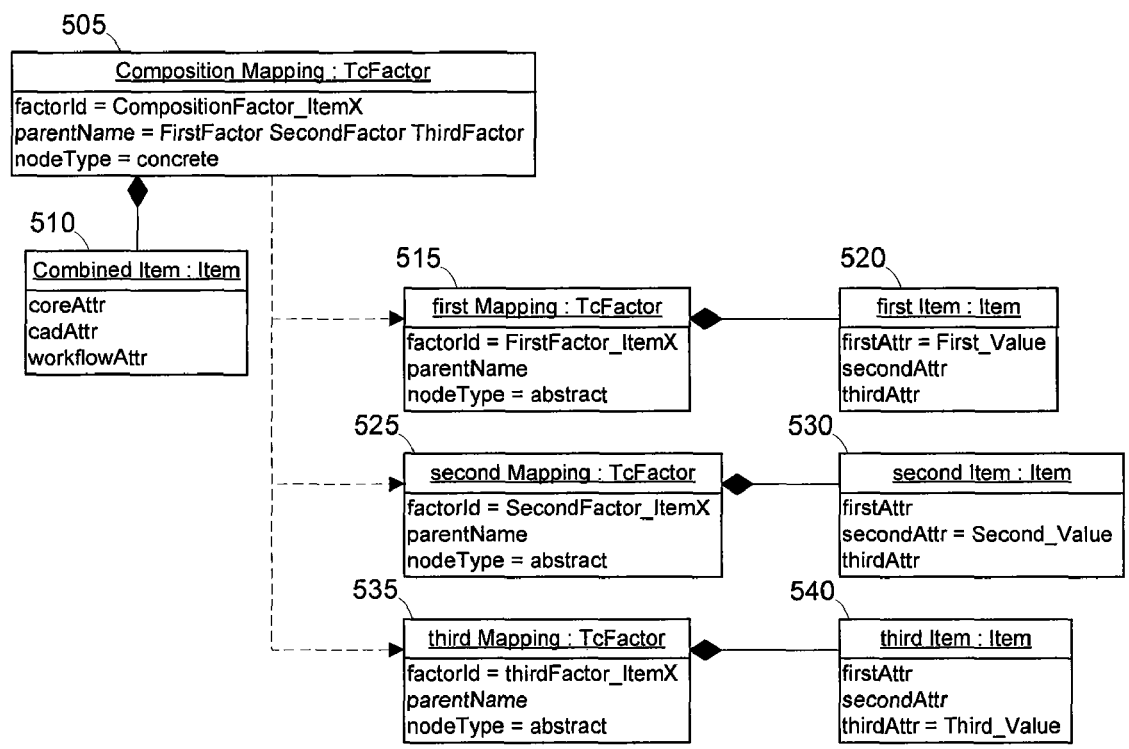
FIG. 5 illustrates a multiple-inheritance graph that can be produced in accordance with disclosed embodiments.
Figure 6:
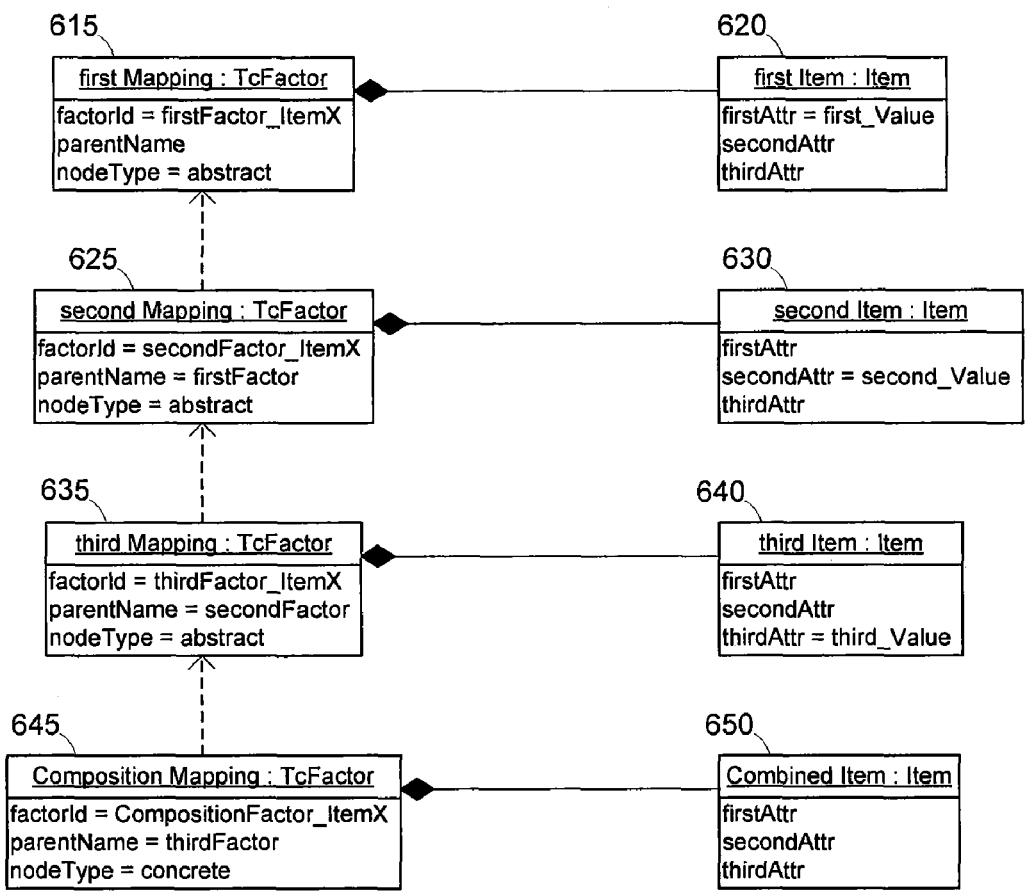
FIG. 6 shows a single inheritance graph corresponding to the multiple inheritance graph of FIG. 5, in accordance with disclosed embodiments.

In some embodiments, and optionally, multiple inheritance can simplify the logical model for mapping. Through multiple inheritance, the Mapper Engine can support composition. For example, consider an item "Item" for which there are three different groups that wish to specify mappings. Those three groups are the First Team, Second Team, and Third Team. Additionally, assume that the Item has three attributes of interest, which are firstAttr, secondAttr, and thirdAttr. In this example, each of the development teams independently develops a mapping. FIG. 5 illustrates a multiple-inheritance graph that can be produced in accordance with disclosed embodiments.

In FIG. 5, the specific mappings can be developed independently, and the composition of a mapping can be dynamically constructed. Supporting multiple inheritance requires the parentName attribute that supports multiple entries.

While multiple inheritance provides support for additional physical topologies, it does not provide additional logical topologies. What this means is that each multiple inheritance graph can be logically represented in a comparable single inheritance graph. For example, the multiple inheritance graph of FIG. 5 can be represented in the single inheritance graph of FIG. 6.

One benefit of multiple inheritance is the ability to support isolation of mappings; this benefit produces advantages in producing mappings independently and in dynamically composing mappings.

In some embodiments, multiple inheritance at design time is implemented at run-time as nested inheritance. This allows the inheritance to be determined by the designer of the composite mapping (505), instead of being determined by the creators or the other mappings (515, 525, 535). Without this ability, the makers of (at least two out of three) the parent mappings would need to identify the parent mapping (via the parentName). According to disclosed embodiments, the composite mapping can dynamically assign applicable mappings (and order of mappings) from which they will inherit.

As an example, assume that there were two existing mappings (call them A and B) for an element containing 3 attributes (call them X, Y, and Z), and that

A={X→"1", Y→"2"}
B={Y→"3", X→"4"}

Child mappings could be specified that inherit mappings via inheritance of A and B as either {X→"1", Y→"2", Z→"4"} or
{X→"1", Y→"3", Z→"4"} depending on the order specified in the parentName value the child mapping.

Figure 7:
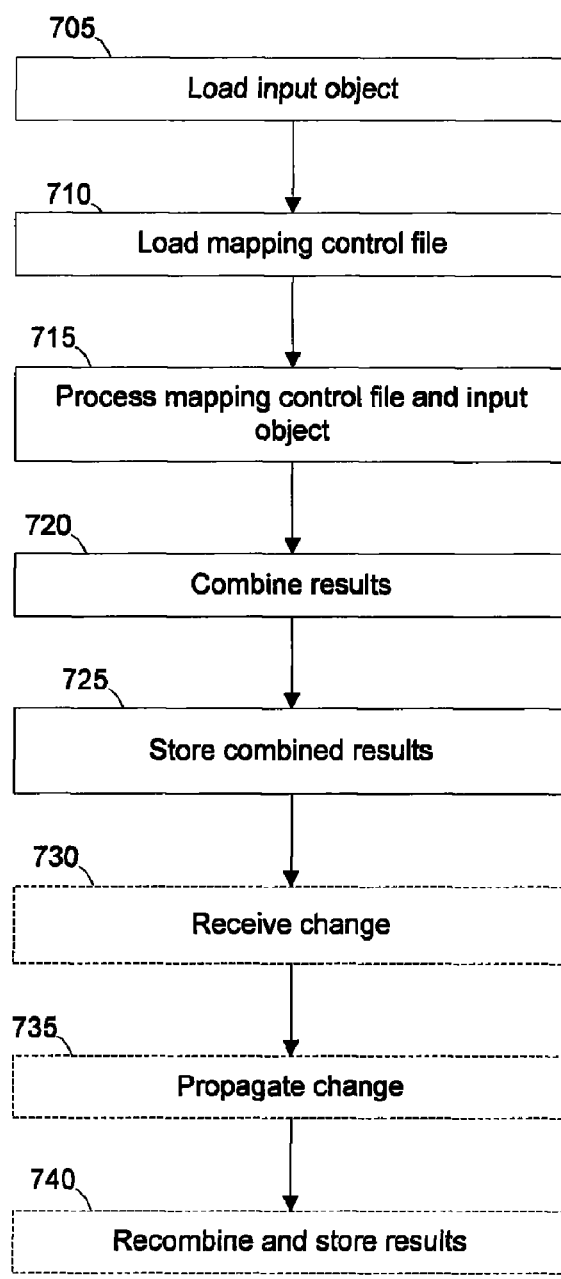
FIG. 7 depicts a process in accordance with disclosed embodiments.

FIG. 7 depicts a flowchart of a process in accordance with disclosed embodiments.

The data processing system loads an input object, for example an extensible markup language (XML) document defining a set of elements as a factor (step 705). Loading can include retrieving from memory or other storage, receiving from another computer, or even receiving a user input.

The data processing system loads a mapping control file (step 710).

The data processing system processes the mapping control file and input object to produce a result set including a plurality of result documents, one for each mapping defined in the mapping control file with criteria matching that of an element of the input object (step 715).

The data processing system combines multiple ones of the plurality of result documents in the result set, according to the inheritance data defined in the mapping control file, to produce at least one combined element as a combined result (step 720).

The data processing system stores the combined result and optionally displays it to a user (step 725). The combined result is a transformation of the input object into the second data format, with the appropriate attributes and values passed through the inheritance rules defined in the mapping control file.

The data processing system thereafter can optionally receive a change to the result set or the combined result (step 730).

The data processing system propagates the change to result set and/or combined result in accordance with the inheritance data, and stores the result set/combined result (step 735). Note that the inheritance data specifies how the changes are inherited, so that the propagation does not overwrite data that should be preserved.

The data processing system optionally recombines the result set according to the inheritance data, and stores and/or displays the final result (step 740).

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for data mapping, comprising:
loading an input object in a data processing system, the input object including a plurality of elements;
loading a mapping control file in the data processing system;
processing the input object and the mapping control file to produce a result set including a plurality of result documents;
combining multiple ones of the plurality of result documents, by the data processing system, according to inheritance data defined in the mapping control file to produce a combined result, the inheritance data including an inheritance graph for each result document that defines how to combine the result documents; and
storing the combined result in the data processing system.

2. The method of claim 1, further comprising:
receiving a change to at least one result document of the result set;
propagating the change to other result documents of the result set according to the inheritance data;
recombining multiple ones of the plurality of result sets, by the data processing system, according to the inheritance data to produce a revised combined result; and
storing the revised combined result in the data processing system.

3. The method of claim 1, wherein the input object is an XML document.

4. The method of claim 1, wherein the result set includes a result document each mapping defined in the mapping control file with a criterion matching that of an element of the input object.

5. The method of claim 1, wherein the combined result is a transformation of the input object into a second data format.

6. The method of claim 1, wherein the mapping control file defines parent-child inheritance relationships between multiple ones of the plurality of result documents.

7. The method of claim 1, further comprising generating an element identification attribute for at least one of the plurality of attributes.

8. A data processing system comprising a processor and accessible memory, the data processing system configured to perform the steps of:
loading an input object, the input object including a plurality of elements;
loading a mapping control file;
processing the input object and the mapping control file to produce a result set including a plurality of result documents;
combining multiple ones of the plurality of result documents according to inheritance data defined in the mapping control file to produce a combined result, the inheritance data including an inheritance graph for each result document that defines how to combine the result documents; and
storing the combined result.

9. The data processing system of claim 8, the data processing system further configured to perform the steps of:
receiving a change to at least one result document of the result set;
propagating the change to other result documents of the result set according to the inheritance data;
recombining multiple ones of the plurality of result sets, by the data processing system, according to the inheritance data to produce a revised combined result; and
storing the revised combined result in the data processing system.

10. The data processing system of claim 8, wherein the input object is an XML document.

11. The data processing system of claim 8, wherein the result set includes a result document each mapping defined in the mapping control file with a criterion matching that of an element of the input object.

12. The data processing system of claim 8, wherein the combined result is a transformation of the input object into a second data format.

13. The data processing system of claim 8, wherein the mapping control file defines parent-child inheritance relationships between multiple ones of the plurality of result documents.

14. The data processing system of claim 8, the data processing system further configured to perform the steps of generating an element identification attribute for at least one of the plurality of attributes.

15. A non-transitory computer-readable medium encoded with computer executable instructions that, when executed, cause a data processing system to perform the steps of:
loading an input object in a data processing system, the input object including a plurality of elements;
loading a mapping control file in the data processing system;
processing the input object and the mapping control file to produce a result set including a plurality of result documents;
combining multiple ones of the plurality of result documents, by the data processing system, according to inheritance data defined in the mapping control file to produce a combined result, the inheritance data including an inheritance graph for each result document that defines how to combine the result documents; and
storing the combined result in the data processing system.

16. The computer-readable medium of claim 15, encoded with further instructions that, when executed, cause a data processing system to perform the steps of:
receiving a change to at least one result document of the result set;
propagating the change to other result documents of the result set according to the inheritance data;
recombining multiple ones of the plurality of result sets, by the data processing system, according to the inheritance data to produce a revised combined result; and
storing the revised combined result in the data processing system.

17. The computer-readable medium of claim 15, wherein the input object is an XML document.

18. The computer-readable medium of claim 15, wherein the result set includes a result document each mapping defined in the mapping control file with a criterion matching that of an element of the input object.

19. The computer-readable medium of claim 15, wherein the combined result is a transformation of the input object into a second data format.

20. The computer-readable medium of claim 15, wherein the mapping control file defines parent-child inheritance relationships between multiple ones of the plurality of result documents.

* * * * *